United States Patent
Del Gallo et al.

(10) Patent No.: US 8,554,184 B2
(45) Date of Patent: Oct. 8, 2013

(54) SYSTEM, METHOD AND COMPUTER PROGRAM PRODUCT FOR MONITORING THE FILLING IN OF REMOTE FORMS

(75) Inventors: Ulisse Del Gallo, Rome (IT); Carlo Ortensi, Rome (IT); Francesco Zampini, Rome (IT)

(73) Assignee: Accenture Global Services Limited, Dublin (IE)

( * ) Notice: Subject to any disclaimer, the term of this patent is extended or adjusted under 35 U.S.C. 154(b) by 730 days.

(21) Appl. No.: 12/373,724

(22) PCT Filed: Jul. 13, 2007

(86) PCT No.: PCT/EP2007/006250
§ 371 (c)(1),
(2), (4) Date: Jun. 29, 2010

(87) PCT Pub. No.: WO2008/006611
PCT Pub. Date: Jan. 17, 2008

(65) Prior Publication Data
US 2010/0261458 A1    Oct. 14, 2010

(30) Foreign Application Priority Data
Jul. 14, 2006 (EP) .................. 06425490

(51) Int. Cl.
*H04M 3/42* (2006.01)
*H04W 4/00* (2009.01)

(52) U.S. Cl.
USPC ............ 455/414.1; 455/414.2; 455/466

(58) Field of Classification Search
USPC .................. 455/414.1, 412.2, 406, 466
See application file for complete search history.

(56) References Cited

U.S. PATENT DOCUMENTS

| 5,561,446 A | 10/1996 | Montlick |
| 6,010,737 A | 1/2000 | Meade |
| 6,634,551 B2 * | 10/2003 | Barta et al. ............... 235/385 |
| 6,741,724 B1 * | 5/2004 | Bruce et al. ............... 382/101 |

(Continued)

FOREIGN PATENT DOCUMENTS

| WO | WO 01/16691 A1 | 3/2001 |
| WO | WO 2006/010737 A2 | 3/2006 |

OTHER PUBLICATIONS

Chinese Office Action with English translation received in corresponding Chinese Application No. 200780031311.2, 7pages, dated Aug. 11, 2010.

(Continued)

*Primary Examiner* — Marisol Figueroa
(74) *Attorney, Agent, or Firm* — Brinks Hofer Gilson & Lione

(57) ABSTRACT

A system monitors the remote filling of forms. The system includes an electronic writing device that may detect form input data corresponding to a first predefined area and a second predefined area of a form. The system also includes a mobile station that may receive the form input data from the electronic device and send the form input data to a monitoring station. The mobile station may receive an error notification from the monitoring station when the form input data corresponding to the first predefined area is deficient, but may not receive an error notification when the form input data corresponding to the second predefined area is deficient. The mobile station may generate an output signal in response to receive an error notification.

31 Claims, 8 Drawing Sheets

-ASH: Application Service Handler
-GPLS: Global Page Lookup Server(Anoto)

(56) References Cited

U.S. PATENT DOCUMENTS

| | | | |
|---|---|---|---|
| 2002/0004382 A1* | 1/2002 | Cox et al. ................. | 455/414 |
| 2002/0026413 A1 | 2/2002 | Wu | |
| 2002/0107885 A1 | 8/2002 | Brooks et al. | |
| 2002/0166895 A1 | 11/2002 | Wiebe et al. | |
| 2007/0066288 A1* | 3/2007 | Soelberg et al. ............. | 455/415 |
| 2007/0145110 A1* | 6/2007 | Kelley et al. ............... | 235/375 |
| 2008/0181501 A1* | 7/2008 | Faraboschi et al. .......... | 382/179 |

OTHER PUBLICATIONS

English Translation of the Chinese Office Action received in corresponding Chinese Application No. 200780031311.2 dated May 6, 2011 (Original Chinese Language Office Action also submitted).

International Preliminary Report on Patentability, International Application No. PCT/EP2007/006250, Jan. 14, 2009.

International Search Report, International Application No. PCT/EP2007/006250, Dec. 27, 2007.

European Search Report from EP 06425490.7-1527, Nov. 11, 2006.

\* cited by examiner

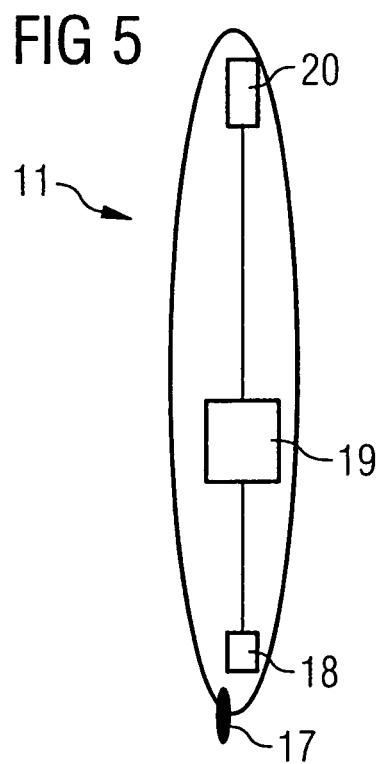
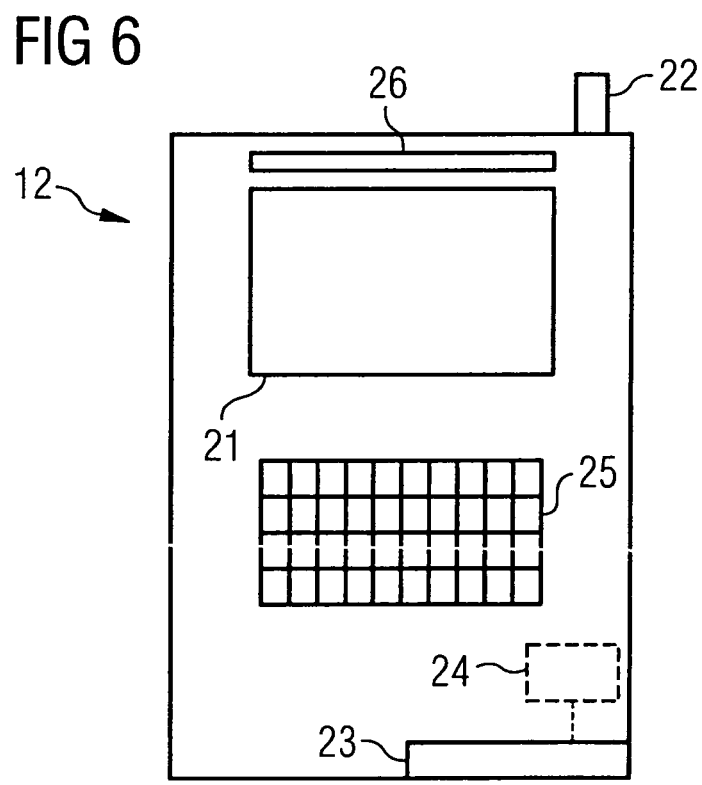

SYSTEM, METHOD AND COMPUTER PROGRAM PRODUCT FOR MONITORING THE FILLING IN OF REMOTE FORMS

The present invention relates to a system for monitoring the filling of remote forms with at least one electronic writing means, with at least one mobile station and with a stationary station, and to a corresponding method and computer program product.

An electronic writing means is disclosed, for example, in WO 03/046708 A1, said electronic writing means being an electronic pen for recording of handwritten information. The electronic pen has a control unit and a memory. When the user moves the pen in desired pen movements across a writing base, the pen movements are recorded as a plurality of digital pen strokes which are stored locally in the pen in order to await subsequent transmission to a server by a wireless communication link. To permit this recording, the writing base is provided with a position-coding pattern.

US 2003/0029919 A1 also discloses an electronic writing means which enables an user to input hand-written and hand-drawn information to a computer while the information is being written/drawn on the writing surface. On the writing surface a position code is arranged for coding X/Y coordinates of positions on the surfaces. The electronic writing means has a writing tip by means of which the user can write or draw on the writing surface. Furthermore, the electronic writing means has a light source for illuminating the position code and a CCD sensor for forming an image on the position code. The positional information received by the CCD sensor is transferred to a computer for processing.

In the field of drop-off services like e.g. mailing services, when an item is delivered by a deliverer such as a postman or courier to an addressee, it is common practice to fill in a form which has to be undersigned by the addressee in order to confirm receipt of the item. Moreover, according to the regulations of several states, the signature has to be a physical signature on paper or cardboard, while electronic signatures or handwritten signatures made on electronic devices which store the signature in an electronic form are not permitted. For different reasons it turned out that in practice the forms are often not correctly filled in, or that the signature of the addressee is even missing on the form. In general, such deficiencies are not noticed until the deliverer returns back from his delivery tour. In such a case the deliverer or someone else has to return to the addressee to have the form belatedly signed or to have a new, correctly filled in form signed. This results in additional and unnecessary work, expenses and costs as well as in additional efforts in the internal organization of the service. The case is even worse when the addressee is not encountered on the repeated tour, which also often occurs, so that the tour to the addressee has to be repeated more than once.

It is therefore the object of the present invention to provide a system and a method which allow for monitoring of the filling in of remote forms.

This object is solved by the features of the independent claims. Preferred embodiments of the invention are subject of the dependent claims.

According to the invention, there is provided a system for monitoring, particularly checking, verifying and/or screening the filling in or executing of remote forms comprising at least one electronic writing means, at least one mobile station and a monitoring station, preferably comprising a stationary station, separate from the mobile station;

wherein the electronic writing means comprises detection means for detecting information while the electronic writing means is moved on the form in a position corresponding to at least one predefined area of the form, and a first transceiver for sending said detected data (in at least partly processed or unprocessed manner) to the mobile station;

wherein the mobile station includes output means for generating an output, a second transceiver for receiving detected data from the writing means and for at least partly sending the received detected data (in at least partly processed or unprocessed manner) to the monitoring station;

wherein the monitoring station includes a third transceiver for receiving the detected data from the mobile station, and a processing device for checking on the basis of said received detected data that the form has been correctly filled in, and wherein, if at least a first predefined area is incorrectly filled in, the third transceiver sends a notification to the mobile station, whose output means generates an output after receipt of said notification by the second transceiver.

In this connection the term 'form' means any surface which is to be written upon according to certain rules. In particular, the term 'form' is not limited to sheets of paper or cardboard, but will include every one-, two- or three-dimensional object with a surface which can be written upon according to certain rules.

Particularly, the electronic writing means and the mobile station can be ported by the deliverer such as a postman or a courier who makes his tour to one or more addressees to deliver certain items such as registered mails, parcels or the like. In order to complete the delivery of the items, the form at least partly is (electronically and/or physically) filled in or completed or executed using the electronic writing means. Since the mobile station, preferably substantially immediately or after a short time (of e.g. few seconds to few minutes), transmits the detected or digital data representing the written information after having received them from the electronic writing means, it is possible to check said written information at the stationary station even while the deliverer is yet with the addressee. Accordingly, it is advantageously possible to monitor the at least partial filling in or completing of remote forms within a very short time frame (such as few seconds to few minutes), preferably substantially in realtime. Hence, if any inconsistency or incorrectness is noticed at the filled in or executed form, for example an empty area which is necessarily required to be filled in (such as an area for the signature of the addressee for registered mails), or an area which is wrongly filled in like an area being simply crossed while it is provided for filling in the delivery date, the attention of the deliverer can at once be drawn to this fact thanks to the notification from the stationary station and the final output generated by the mobile station. The deliverer can thus immediately amend, correct and/or complete the form while being still on or near location particularly in presence of the addressee or, if the deliverer has already left the addressee, by promptly returning to the addressee. Repeated tours to the addressee with a longer time delay are thus no longer necessary. Time is spared and costs are reduced, and the organisation of the service is simplified, which additionally decreases costs.

Each of the first, second and third transceiver may comprise only a single device capable of receiving and/or of transmitting, or it may comprise more than one receiving device and/or more than one transmitting device. For example, in cases where communication between the mobile station and the electronic writing means and/or between the mobile station and the monitoring or stationary station takes place by connections of different kind, it may be suitable to provide the mobile station with a transceiver which comprises a first device for receiving data from the electronic writing means by a connection of a first kind, and which comprises a second device for communication with the monitoring or stationary station by a connection of a second kind. But even the connection between the mobile station and the monitoring or stationary station may include connections of different kinds, depending on the direction of data transfer or the sort of data transmitted. In such a case the second transceiver could comprise multiple devices for the communication with the monitoring or stationary station. Correspondingly, the third transceiver may comprise only one device capable of receiving and of transmitting, or it may comprise more than one receiving device as well as more than one transmitting device. The latter may be suitable in cases where the receipt of the digital data from the mobile station, and the transmission of the notification take place by connections of different kind. According to a preferred embodiment of the invention, the electronic writing means comprises a writing tip or means for writing information on a surface of the form (e.g. by means of conventional ink) by moving the writing tip over the surface, wherein the detection means detects the information while it is (physically) written by the writing tip into at least one predefined area of the surface covered with a positioning coding pattern. Accordingly, it is advantageously possible to physically fill in the form (e.g. for legal reasons) while (substantially concurrently) detecting the filled in information in electronic format by means of the positioning coding pattern provided on the form.

Preferably, the electronic writing means comprises a processor for processing the road information and at least partly converting it into digital data before or while the first transceiver sends said digital data to the mobile station.

Further preferably, the electronic writing means and the mobile station are connected by Bluetooth for transmission of the detected or digital data. Accordingly, a reliable and particularly safe transmission of data is possible.

Still further preferably, the mobile station and the monitoring station are connected by the Internet and/or by UMTS (Universal Mobile Telecommunication System) and/or by GPRS (General Packet Radio System) and/or by MMS (Multimedia Messaging Service) for sending the detected or digital data and/or for sending the notification.

Most preferably, the notification is sent by SMS (Short Message Service) or by MMS and/or by email.

According to a further preferred embodiment, the mobile station is a cell phone.

Preferably, the output means are optical and/or acoustical output means, in particular output means provided in the cell-phone.

Further preferably, the monitoring station comprises storage means for storing the digital data, wherein the stored digital data are at least partly replaced by newly generated digital data, when the form is amended and/or filled in. Accordingly, the deliverer has the possibility of updating and/or correcting of information e.g. by marking correction on the form by means of the electronic writing means.

Most preferably, the processing device at least partly processes the detected data such as to substantially reflect the information written by the electronic writing means in a facsimile format and making available said information preferably on-line. In other words, the processing device can at least partly convert the detected or digital data back into (a facsimile form of) the information (physically) written by the electronic writing means for making available said information preferably on-line in a facsimile manner. Accordingly, it is advantageously possible to inform other entities such as the sender of the item to be delivered of the performed delivery and to transmit or make available the filled in form to him, e.g. in view of legal actions to be taken or the like.

According to a further preferred embodiment of the invention, if at least one of second predefined areas of the form is incorrectly filled, the monitoring station generates an error report. Accordingly, it is possible to notify the deliverer such error report so that he may take appropriate action. In particular, the second predetermined areas may refer to or contain information which the deliverer such as the postman or courier can fill in without the assistance of the addressee (e.g. delivery time, delivery place, signature of the deliverer) so that he may do so at a later time and/or in the absence of the addressee.

Preferably, the mobile station comprises an interface for receiving data, and storage means for storing data received through the interface, and where the output means comprise a display for displaying said data, wherein the interface preferably comprises an USB (Universal Serial Bus) interface and/or a Bluetooth interface.

Further preferably, the monitoring station includes a database for storing mailing addresses. Still further preferably, the mobile station has access to the database for at least partly amending, preferably updating mailing addresses stored in the database, wherein changes of mailing addresses preferably can be manually input into the mobile station. Most preferably, the mobile station has access to the database via the Internet.

According to a further preferred embodiment of the invention, the monitoring station and/or the mobile station have access to GPS (Global Positioning System) for determining the an addressee route, preferably comprising a shortest or fastest route to a mailing address and/or the shortest or fastest route which connects several mailing addressees.

Preferably, the mobile station has access to GPS and where the mobile station determines its current position based on data received from GPS, and sends information about its current position to the monitoring station. Accordingly, it is advantageously possible to detect the current position (in GPS coordinates and/or in form of an address or place corresponding to such coordinates) of the deliverer upon the filling in or execution of the form by the addressee.

Further preferably, the mobile station supports the performance of online payments, wherein the mobile station preferably sends information regarding online payments and/or cash payments to the monitoring station. Still further preferably, the mobile station comprises storage means for storing data regarding payments made.

Most preferably, the electronic writing means sends the digital data to the mobile station only when a default area of the predefined areas is marked with the electronic writing means. Accordingly, the transmission of the detected or digital data to the mobile station and/or further to the monitoring station can be triggered or started by e.g. ticking a box in the form.

According to the invention, there is further provided a method for monitoring the filling in or executing of remote forms, particularly using the system for monitoring the remote filling in of forms according to the invention or a preferred embodiment thereof, the method comprising the following steps:

(a) providing at least one remote form comprising at least one predefined area;

(b) writing of information into the predefined area by means of an electronic writing means while electronically detecting it;

(c) at least partly sending the detected data from the electronic writing means to a mobile station;

(d) sending said detected data (in an at least partly processed or unprocessed form) from the mobile station to a monitoring station;

(e) on the basis of said detected data, monitoring, preferably checking that the form is correctly filled in;

(f) if at least a first predefined area of the form is incorrectly filled in, sending a notification from the monitoring station to the mobile station; and (g) after receiving said notification at the mobile station, generating an output with output means of the mobile station.

According to a preferred embodiment of the invention, the remote form has a structured surface such that the at least one predefined area comprises or is at least partly covered with a positioning coding pattern. Accordingly, it is easily possible to electronically detect the information being physically written (e.g. with ink) on the surface by the electronic writing means.

Preferably, the steps (a)-(e) are repeated until in step (f) it is confirmed that all of the first predefined areas of the form are correctly filled in. Accordingly, it can be advantageously ensured that those areas of the form are correctly and/or completely filled in or executed particularly by the addressee.

Further preferably, after step (d) the detected data is at least partly stored in the monitoring station, wherein the stored detected data preferably are at least partly replaced by the latest generated detected data.

Still further preferably, after step (d) the detected data is processed such as to substantially reflect the information written by the electronic writing means in a facsimile format and said information is made available preferably on-line.

Most preferably, an error report is generated when at least a second predefined area of the form is incorrectly filled in. Accordingly, it is possible to notify the deliverer such error report so that he may take appropriate action. In particular, the second predetermined areas may refer to or contain information which the deliverer such as the postman or courier can fill in without the assistance of the addressee (e.g. delivery time, delivery place, signature of the deliverer) so that he may do so at a later time and/or in the absence of the addressee.

According to a preferred embodiment of the invention, data are fed into and/or transmitted to the mobile station and wherein the data are displayed by the output means of the mobile station.

Preferably, the method further comprises a step of determining an addressee route, preferably comprising a shortest route to a mailing address and/or a shortest route which connects several mailing addressees.

Further preferably, in step (c) the detected data is only sent when in step (b) a default area of the predefined areas is marked with the electronic writing means. Accordingly, the transmission of the detected or digital data to the mobile station and/or further to the monitoring station can be triggered or started by e.g. ticking a box in the form.

Most preferably, with the notification (also) information about incorrectly filled in predefined areas are sent to and output by the output means.

According to the invention, there is further provided a computer program product, in particular embodied on a computer-readable storage means or signal, the computer-program product comprising computer-readable instructions which when loaded and executed on a suitable system, in particular a monitoring system according to the invention or a preferred embodiment thereof, perform the steps of a method according to the invention or a preferred embodiment thereof.

To make sure that the repeated attempt to correctly fill in the form will at the end lead to a correctly filled form, the steps (a)-(f) are repeated until it is confirmed in step (g) that all of the first predefined areas of the form are indeed correctly filled in.

In the above, the connections established between the electronic writing means and the mobile station and between the mobile station and the monitoring or stationary station can be of different kind. For example, a wire connection may be provided between the electronic writing means and the mobile station for sending the digital data to the mobile station, or they may be connected wireless. It is preferred to connect the electronic writing means and the mobile station wireless by Bluetooth, although other suitable wireless connections may be provided. Further, the mobile station and the monitoring or stationary station may be connected by the Internet and/or by UMTS (Universal Mobile Telecommunication System) and/or by GPRS (General Packet Radio System) and/or by MMS (Multimedia Messaging Service) for sending the digital data and/or for sending the notification. In one embodiment of the invention the notification is sent by SMS (Short Message Service), whereas in other embodiments the notification is sent by MMS and/or by email.

In a preferred embodiment of the invention the mobile station is a cell phone. The output means of the mobile station can be optical and/or acoustical output means. For example, the mobile station can simply output an optical or an acoustical signal after receiving the notification for drawing the deliverer's attention to errors in the form. An optical and an acoustical signal could also be simultaneously outputted. For instance, the optical output means may be a simple diode and the acoustical output means may produce an acoustic chimes signal as it is well known from cell phones. It is however preferred that the output provides detailed information for the deliverer concerning the errors in the filled form. For example, when the notification is sent by SMS, MMS and/or by email, the mobile station can comprise a display in which the SMS, MMS and/or email is outputted or displayed. If the notification comprises detailed information about the errors in the form, this information can be at least partly shown in the display so that the deliverer can read it or become aware of it.

The monitoring or stationary station comprises preferably a storage means for storing the digital data, which makes it possible to archive delivery proceedings for later researches. In a preferred embodiment of the invention the stored digital data are at least partly replaced by newly generated digital data, when the form is amended. In this way accumulation of unnecessary data is avoided and the storage capacity of storage means is spared. Also preferably, the monitoring or stationary station is adapted to generate or convert the digital data back into the information corresponding to the one originally written by the electronic writing means and to make this information available (e.g. publish said information) particularly on-line, preferably together with an image of the form showing the written information in its corresponding place on the surface or corresponding area of the form. Thus a customer of the delivery service can ascertain himself of the correct receipt of the delivered item.

It is possible that the system distinguishes between one or more first predefined areas and one or more second predefined areas of the surface. Second predefined areas of the form could be such which can be amended or completed without support of the addressee or any other external person, like e.g. the delivery date. Errors in second predefined areas could be such which can be easily amended in-house e.g. without support of or need of presence of the addressee and thus without the need of returning to the addressee. It is in such a case not necessary to order the deliverer back to the assignee. Therefore, in a further preferred embodiment of the invention, if during the check of the digital data a second predefined area of the form is found to be incorrectly filled, the monitoring or stationary station may generate only an error report without generating a notification. After return of the deliverer the errors in the second predefined area of the form can be amended in house according to the error report.

Further preferably the mobile station comprises an interface for receiving data, and/or storage means for storing data received through the interface, wherein the output means comprise a display for displaying said data. Said data received by the mobile station comprise preferably a list of mailing addresses whereto items have to be delivered. Thanks to displaying the list of mailing addresses in the display the deliverer has an overview over the addresses he has to visit, and no address can be overseen. The interface can for example be an USB (Universal Serial Bus) interface or a Bluetooth interface.

It is also possible for the monitoring or stationary station to include a database for storing mailing addresses. These mailing addresses may be the addresses of possible addressees. In such a case it is preferred that the mobile station has access to the database for amending the mailing addresses stored in the database. This access may be due to a wired connection between the mobile station and the monitoring or stationary station. A preferred way for the mobile station to get access to the database is the Internet. Thus the database can be substantially immediately and without substantial delay amended if during the delivery tour any address turns out to be incorrect. In a preferred embodiment of the invention, it is therefore possible for the deliverer to manually input changes of mailing addresses, of the addresses of locations (e.g. a civil house number he has noted not to exist or newly to exist) into the mobile station, wherein the mobile station sends these changes, amendments, additions, deletions or the like to the database for updating the corresponding addresses (such as mailing addresses) stored therein.

In another preferred embodiment of the invention the monitoring or stationary station and/or the mobile station has access to GPS (Global Positioning System) for determining the shortest or fastest route to a mailing address and/or the shortest or fastest route which connects several mailing addresses. It is thus possible to optimise the tour a deliverer has to make. If the monitoring or stationary station has access to GPS, the shortest route can either be determined by the monitoring or stationary station itself, wherein the result of the determination is sent to the mobile station. Alternatively or additionally, the data obtained by GPS or calculated on this basis are send from the monitoring or stationary station to the mobile station which then determines the respective shortest or fastest route itself. If the mobile station is the one having access to GPS, it is preferred that the mobile station itself collects the necessary data from GPS and determines the shortest route. In the latter case, when the mobile station has access to GPS, it is further preferred that the mobile station repeatedly sends information about its current position to the monitoring or stationary station, so that the current position of the deliverer can be monitored at any time at the location of the monitoring or stationary station.

When delivering an item it is often the case that payments have to be made. Sometimes the postage or an additional postage has to be paid or the item itself is paid by the addressee at its receipt. Therefore the mobile station could further support the performance of online payments. The payments may comprise payments made with a credit card or any other cards for electronic cash. It is further preferred that the mobile station sends information regarding online payments and/or cash payments to the monitoring or stationary station. Thus, the monitoring or stationary station has a permanent and detailed overview over performed monetary flows, and since the payments can be performed immediately, a substantial delay of the payment is omitted. The mobile station can alternatively comprise a storage means for storing data of payments made. Then said storage means may be read out e.g. after the return of the deliverer to the monitoring or stationary station and/or after having sent the respective data to the monitoring or stationary station in order to get information regarding payments made.

In a preferred embodiment of the invention the electronic writing means sends the detected or digital data to the mobile station only when a default area of the predefined areas is marked with the electronic writing means. By providing such a default area the person filling in the form may decide when the filling procedure is finished and when the digital data have to be sent to the mobile station, which will normally occur after the form has been fully filled in. It can thus be assured that only complete sets of digital data are sent in only one transmission. It is to be understood that it is also possible to provide the writing means with a switch or a similar device, wherein the digital data are sent to the mobile station only when said switch is triggered.

These and other objects, features and advantages of the present invention will become more apparent upon reading of the following detailed description of preferred embodiments and accompanying drawings. Particularly, a general overview over a system according to a preferred embodiment of the present invention will be given, before a special embodiment of the invention together with a mode for carrying out the invention are described below. It should be understood that even though embodiments are separately described, single features thereof may be combined to additional embodiments.

FIG. 5 is a schematic illustration of an electronic pen;

FIG. 6 is a schematic illustration of a mobile station;

Figure 1:
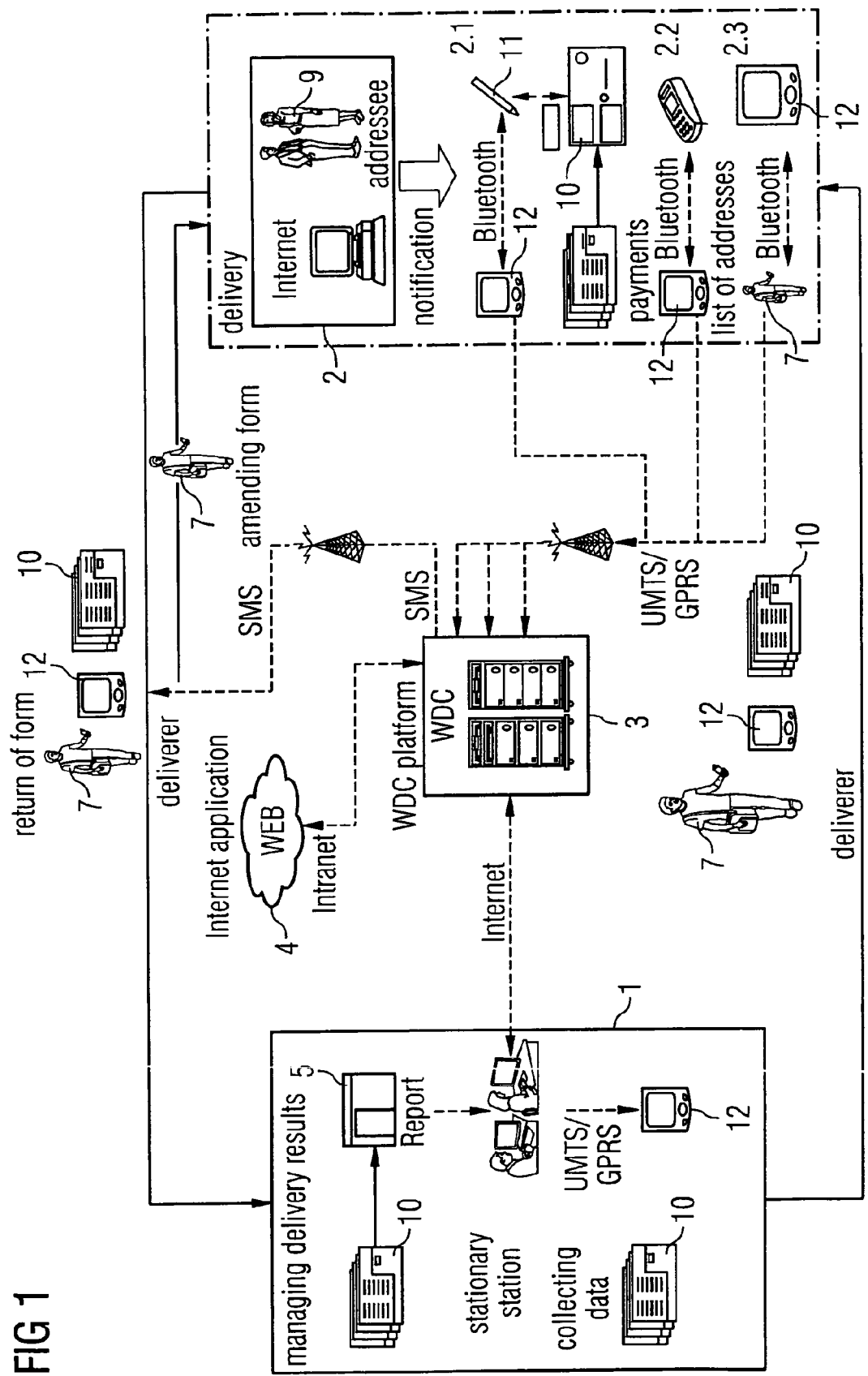
FIG. 1 is a flowchart depicting the general principles of operation of a preferred embodiment of the invention.

General principles of operation of a preferred embodiment of the present invention are depicted in the flowchart diagram schematically shown in FIG. 1.

In FIG. 1, reference numeral 1 denotes a step of receiving data. For that purpose an operator located at a stationary station (as a preferred monitoring station) of the system collects for every deliverer 7 (such as a postman or courier) assigned to a delivery tour respective data which the deliverer ma use to execute his tour. The data are collected at a terminal or work station which is connected to a corresponding data base, which will be described below. Said data comprise for instance information about the objects to deliver (such as registered mails, parcels, cash orders, etc.) during the tour and the addresses of the respective addressees 9. The collected data are or may be at least partly loaded into a mobile station 12 (such as a cellular phone, blackberry, PDA, laptop or the like), preferably one of which is provided for each deliverer 7. Loading may be preferably accomplished by UMTS/GPRS, by Bluetooth and/or by a wired connection like USB between the mobile station 12 and the terminal. When the loading is complete, the operator may receive a message or communication indicating the completion of data transfer, and, in case of a wired connection between the mobile station 12 and the terminal, said connection may be terminated. After data transfer, the operator physically hands the objects to be delivered over to the deliverer 7, which is also physically provided with forms 10 such as confirmations of receipt for these objects, the forms 10 preferably containing (preformatted) information on the object, the mode of delivery and other useful information in coded form (such as code bars or coded fields) or in un-coded form. Hereinafter the term 'form' will mean any surface which is to be written upon according to certain rules. In particular, the term 'form' is not limited to sheets of paper or cardboard, but will include every one-, two- or three-dimensional object with a surface which can be written upon according to certain rules.

While taking the mobile station 12 with the corresponding data, the deliverer 7 sets out for his tour to the respective addressees 9.

At reference numeral 2 the deliverer 7 has arrived to one of the addressees 9. In order to fill in the form 10 of receipt (reference numeral 2.1), the deliverer 7 uses an electronic writing means or electronic pen 11, which is (permanently or intermittently or periodically) connected or connectable with his mobile station 12 preferably by a Bluetooth connection. Electronic pens 11 generally include an internal memory, a battery or accumulator which can be reloaded, a transceiver, which preferably may be or may comprise a Bluetooth transceiver, a camera or detector which preferably is sensitive for a positional coding pattern covering the surface of the form 10 or at least one or more parts thereof, a processor and an ink pen which preferably can be reloaded and which is suitable to write physically information on the (preformatted and/or pre-filled-in) form 10 in conventional manner. The electronic pen 11 is able to sense or detect information written with the same on the special surface, to digitize it and to send it to a remote receiver like a computer. For the purpose of sensing or detecting written information the electronic pen 11 comprises further a force sensor for sensing the force which results from pressing the electronic pen 11 on the surface when writing with the electronic pen 11. If the force sensor senses a corresponding force, the camera or detector and the processor are activated, and the processor converts the written information read by the camera into digital data, which are insertable into a standard template (preferably substantially corresponding to the used form 10) used in the system. For the detailed construction and operation of such an electronic pen 11 reference is made to US 2003/0029919 which is incorporated herein by reference.

The surface of the form 10 to write upon may be the surface of a normal piece of paper or cardboard provided with a positioning coding pattern. The pattern preferably comprises of a punctual grid of small dimensions. According to the size of the grid, it is possible for the electronic pen 11 to recognize his exact position and orientation on the surface, and to recognize which area of the form 10 is being filled in or written on. For the imprint of the grid a resolution of the order of 600 dpi preferably may be sufficient. for the description of coding patterns and surface provided therewith which are preferably to be used in combination with an electronic pen 11 reference is made to WO2003/107265, WO2003/04912, WO2001/71653 and WO2006/006922 which are incorporated herein by reference.

When the deliverer 7 (such as the postman or courier) and/or the addressee 9 writes on the surface of the form 10 provided with the positioning coding pattern using the electronic pen 11, he generates a track of ink on the surface of the form 10. As described above, the electronic pen 11 detects or collects the written information during writing using its internal camera or detector to detect said track of ink in relation to the positioning coding pattern, preferably converts the read information into digital data and sends the digital data to the mobile station 12 preferably by means of the Bluetooth connection.

The deliverer 7 usually has to ascertain that all parts of the form 10 that are necessary e.g. for a legal validation of the delivery are filled in. After completion of the filling of the form 10, the deliverer 7 marks a default or endmark area 16 on the surface of the form with the electronic pen 11 (as will be described later in connection with FIG. 4), the default area 16 being also at least partly covered or provided with the positioning coding pattern. Said mark on the default area 16 triggers the transmission of the digital data comprising relevant information (for example the date of delivery, the name and/or signature of the person who received the delivered object) to a WDC (Wireless Delivery Center) platform 3 preferably by means of UMTS/GPRS.

Figure 8:
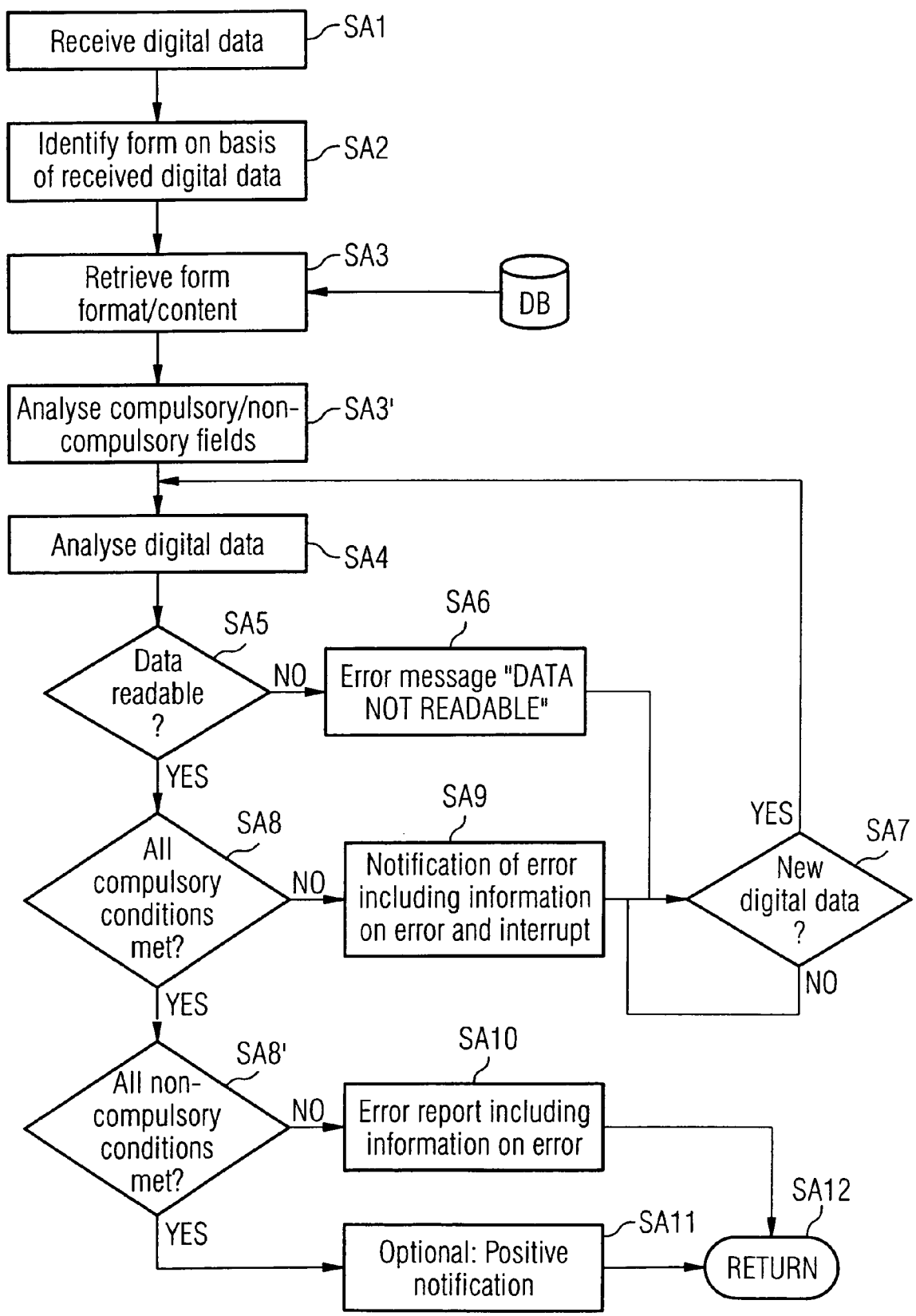
FIG. 8 is a flowchart showing a monitoring or checking routine performed at the stationary station according to a preferred embodiment of the invention.

At the WDC 3 formal checks and/or validations of the received digital data are conducted. As shown in FIG. 8, the validation and/or verification of the received digital data may be performed with one or more of the following steps in this or another order:

- in step SA1 the digital data is received via the mobile station 12 from the WDC3;
- in step SA2 the form 10 being filled out or to which the digital data refer is identified; this identification step SA2 may be performed on the basis of the information (particularly the digital data) received from the electronic pen 11 on the basis of the data read by the electronic pen 11 (e.g. an information coded on or in the coded pattern) and/or on the basis of additional information such as identification numbers, one or more bar codes or code fields;
- in step SA3 retrieving a form format from a database, the form format containing information on the one or more predefined first areas 14 and/or one or more predefined second areas 15 and what kind of information (ticking, name, signature, address, or a5 the like) are to be contained in the respective area 14, 15 when properly filled in, whether the respective field of the form 10 needs to be compulsorily filled in for a proper filling in or execution of the form 10, whether the respective field may be optionally filled in and/or optionally whether the respective field needs to be filled in by the addressee 9 and/or by the deliverer 7 (step SA3');
- in step SA4 the digital data received from the digital pen 11 via the mobile station 12 is analysed for at least some, preferably for each area 14, 15 contained in the respective form 10 in the form format retrieved in step SA3, wherein at least the areas 14 being considered as compulsory are analysed; the additional areas 15 being optional or non-compulsory may be analysed directly or at a later stage, if necessary; in this analysis step the digital data are analysed on the basis of the expected area content: e.g. in case a name is expected to be written in the field an OCR will be preferably performed to identify the name being actually written in the area; in case a signature is being expected it may simply be analysed that (a specified (predetermined or predeterminable) amount of) digital data is present for the respective area or field 14 (particularly without trying to resolve the signature); in case a ticking or cross is expected for a field it is analysed whether a corresponding mark has been placed;

in step SA5 it is determined whether the received digital data is readable; in case in the analysis some data are determined to be not readable, a corresponding notification may be generated to the deliverer 7 (step SA6) preferably depending on whether it is a compulsory field or area or not; if the field or area is not compulsory, or may be filled in by the deliverer 7 possibly at a later stage an error notification is preferably issued;

if the data is determined to be non-readable in step SA5 the receipt of new digital data is waited for in step SA7; when the digital data is received the routine the returns to the analysis step SA4; if no digital data are received with a specified (predetermined or predeterminable) period of time the routine may be interrupted;

in steps SA8 and SA8' the WDC 3 verifies whether the conditions for the respective form 10 are met, e.g. whether all compulsory fields are properly and/or readably/detectably filled in or executed (step SA8); if the conditions are met, then the routine may return (SA12) and preferably a positive notification may be sent to the deliverer 7 (step SA11); if one or more of the conditions are not met (No in SA8 or SA8'), a) in case the erroneous or lacking filling in refers to a compulsory area/field (e.g. the first predefined area 14 is incorrectly or unreadably filled in), i.e. answer NO in step SA8, a notification of error (e.g. via SMS) possibly including information on the incorrect filling in (such as an image of the form including highlighted areas corresponding to the areas incorrectly filled in) is substantially immediately sent (e.g. within about few seconds to minutes) to the deliverer 7 (step SA9) and output (e.g. displayed) on the mobile station 12; the notification of error may comprise an interrupt signal causing a GPS routing to be interrupted and a new route to be calculated/displayed redirecting the deliverer 7 to the addressee 9 corresponding to the incorrectly filled in form 10; then the routine proceeds to step SA7 and waits for new digital data to be received from the mobile station 12 and proceeds to the analysing step SA4 when the data are received; if no digital data are received with a specified (predetermined or predeterminable) period of time the routine may be interrupted;

b) in case the erroneous or lacking filling in refers to a non-compulsory or optional area/field (e.g. the second predefined area 14 is incorrectly or unreadably filled in), i.e. answer NO in step SA8') a notification of error (e.g. via SMS) possibly including information on the incorrect filling in (such as an image of the form including highlighted areas corresponding to the areas incorrectly filled in) is sent to the deliverer 7 (step SA10); the deliverer 7 may react to the error report at this or a later stage and correct or supplement the erroneous fields/areas as needed; then the routine returns (step SA12).

The received digital data may be stored (preferably in an editable way) in expectation of a result of the validation. In case of an error, the WDC 3 sends a notification and/or feedback about the incomplete filling in or executing of the form to the mobile station 12, preferably using SMS. In this way the WDC 3 returns information concerning the incorrect filling in or execution of the form 10, allowing the deliverer 7 to take appropriate action such as to return to the addressee 9 and to amend and/or complete the filling of the form 10. In such a case it is possible that the WDC 3 interrupts processing of the received data in order to make a repeated attempt to fill in the form 10, so as to receive amended digital data. The stored digital data are fed into a database and are published online by the Internet, so that on the same day of the delivery the sender of the delivered object can ascertain himself about the correct receipt of the object by the addressee 9.

Figure 2:
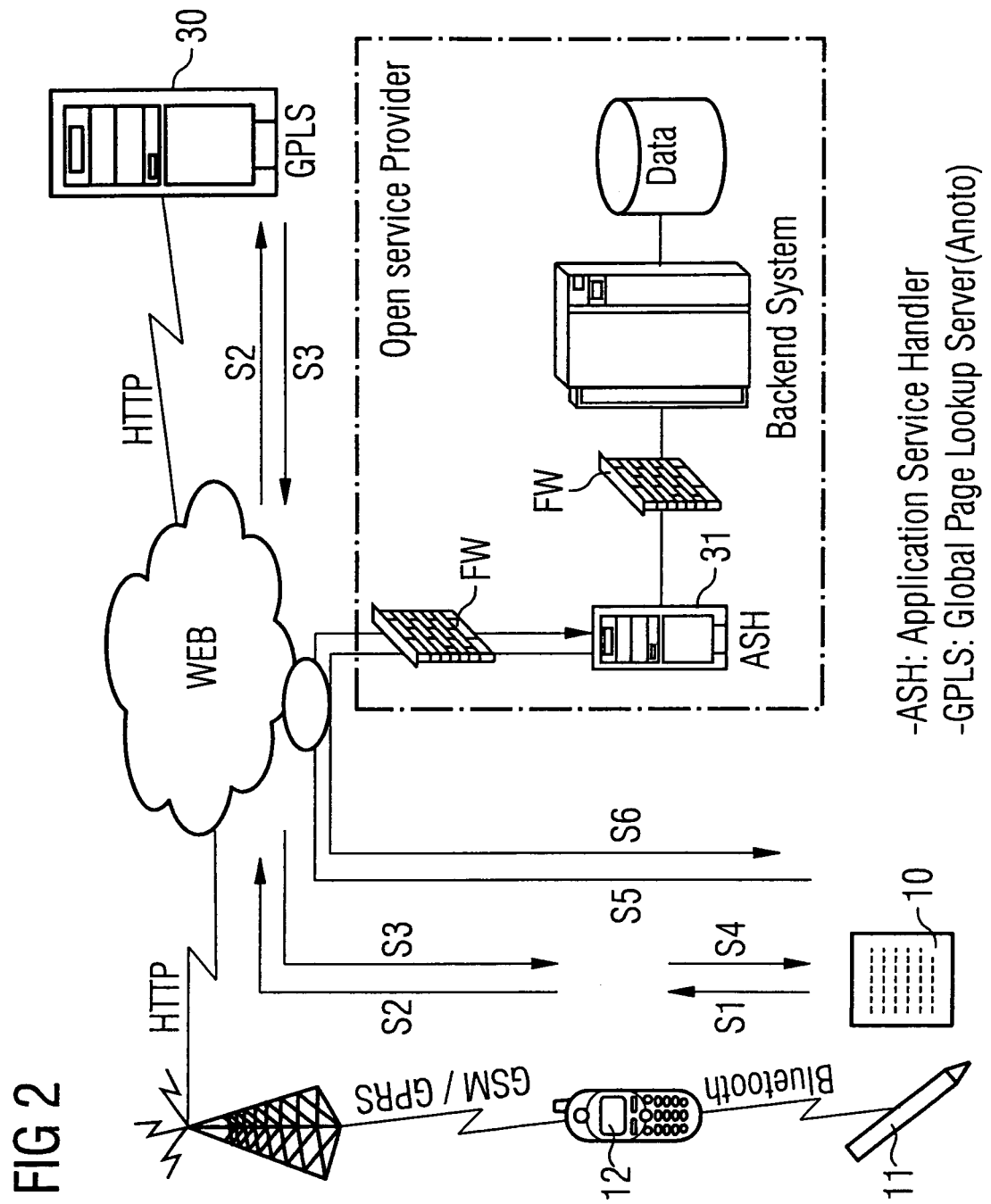
FIG. 2 is an illustration of the main connections involved in the system.

In FIG. 2 preferred procedures of establishing the various connections described above are illustrated. In step S1, after the filling of the form 10 by means of the electronic pen 11 is completed, the electronic pen 11 establishes a connection to the mobile station 12 preferably by Bluetooth. Then, in step S2 the written information read or detected and converted into digital data by the electronic pen 11 are sent by Internet (preferably using a 126 bit encryption) to a GPLS (Global Page Lookup Server) 30 of the WDC 3, the connection preferably being a wireless connection, most preferably a UMTS or GPRS connection; in steps S3 and S4 the result of the processing accomplished at the WDR 3 returns by URL (Uniform Resource Locator) to the mobile station 12 and finally to the electronic pen 11; in step S5 the electronic pen 11 sends the now encrypted digital data preferably by URL to an Application Service Handler ASH 31 for backend processing and/or validation. In an optional step S6, the Application Service Handler ASH 31, after having validated the result, sends a feedback by SMS to the mobile station 12. One or more firewalls FW may be provided in view of avoiding unauthorized access or pyshing of data.

Referring now back to FIG. 1, reference numeral 2.2 denotes payments which can be performed using the mobile station 12 and a further device called POS, which preferably is provided with Bluetooth technology. Alternatively an apparatus corresponding to the POS device may be integrated into the mobile station 12, so that only one apparatus has to be carried by the deliverer 7. The deliverer 7 can conduct financial transactions using credit cards or cards normally used at cash dispensers, but it is also possible to perform payments in cash which are registered at the mobile station 12. In detail, the POS apparatus communicates preferably by Bluetooth the transactions to the mobile station, requesting a payment function. The mobile station 12 registers the transaction, sends a request for validation and communicates the result with the POS. In general, the mobile station 12 permits to send data regarding payments to the WDC 3 for execution of part of or all validation operations necessary for an online payment. Appropriate data of every single payment are stored in an appropriate database, and they can be visualized at an appropriate interface.

Reference numeral 2.3 in FIG. 1 denotes the preferred possibility of getting data regarding addresses (preferably substantially in real-time) thanks to the interaction with an interface of a central database of addresses. While on tour the deliverer 7 may collect various information regarding changes of addresses, as for example changes due to the removal of persons or marriages, changes in the civil number of houses, and may input the changes directly into a corresponding application, which is accessible by the mobile station 12 using the IP-protocol. The data input by the deliverer 7 are sent (at this or a later time) to a database of the system. For example, this may be performed by invoking Web Services or using email.

Furthermore, the mobile station 12 allows it to use the GPS to locate a single address or to determine the shortest or fastest route connecting part of or all the addresses which have to be visited on the tour of the deliverer 7.

Referring to reference numeral 3 in FIG. 1, the WDC platform 3 is able to send and receive messages by UMTS/

GPRS. In particular, the WDC platform 3 receives information sent from the mobile station 12 and/or sends information to the mobile station 12. It generates an initial validation of the information received from the electronic pen 11 via the mobile device 12, including a check of the filled in or executed areas of the form 10 and preferably performs a recognition (such as Optical Character Recognition, OCR) and check of the contents of the filled in areas. A particular status may be assigned to a confirmation of receipt, which may be for example:

Sent:
A confirmation of receipt has been sent to the operator at the stationary station, but has not been validated yet.

Validated:
The Process of validation of the confirmation of receipt has lead to a positive result Confirmed with SMS Transmission:
During the process of verification, there have been discovered not correctly filled in areas on the form 10, and a SMS has been sent to the operator or deliverer 7 preferably along with a description of the necessary actions for amending the filling in of the form 10.

Confirmed with Transmission of a Report:
During the process of verification, there have been discovered not correctly filled in areas on the form 10, and a SMS has been sent to the deliverer 7 preferably along with information (lacking information) about the areas of the form 10 which still are not filled in, that have to be added to the form 10 or confirmation of receipt after return to the monitoring or stationary station 3.

Validation with Supplement of Information by the System:
During the process of validation of the form 10 or confirmation of receipt, lacking information is supplemented by the system.

Once the areas of the form 10 or confirmation of receipt have been validated, the WDC platform 3 stores the information in a database, making it available for successive applications. In the case of an incomplete filling in of the confirmation of receipt or the form 10, the WDC 3 by SMS provides a message to the deliverer. The information is made available (such as published) by an appropriate terminal, making it accessible by a corresponding WorkStation, or by the Internet preferably by means of appropriate password or safe-access links.

With reference to reference numeral 4 of FIG. 1, the system provides for the realization of an Internet application or Internet interface for one or more operators. By the interface the operators have access to various functions, once they have identified themselves to the system. For this purpose the system requires an identification code or a password. The homepage of the Internet application includes buttons for selecting a respective function.

The application allows an operator to outsource the necessary information in the step of receiving data (see reference numeral 1). Further, the application preferably allows the deliverer to make amendments on the collected information once he has returned.

Referring to reference numeral 5 in FIG. 1, the digital data concerning the form 10 or the confirmation of receipt, worked out or processed at the WDC platform 3, are stored preferably in an open status, expecting the result of the validations procedure. The deliverer 7, preferably having finished his delivery tour, returns to the starting point of the tour. The operator, at his Work Station, may enter the Internet application and get information on those forms 10 or confirmations of receipt, which have been found to be incomplete and which are possible to amend in house (i.e. without the assistance or need of the addressee 9), and generates an error report for the deliverer 7. The deliverer 7 may take or process the incorrectly filled in forms 10 or confirmations of receipt, and reopens respective files of these incorrectly filled forms 10 or confirmations of receipt to complete the filling in of the form 10 with his electronic pen 11. He then closes the files of the amended forms or confirmations of receipt. The system saves the amended digital data, at least partly overwriting the previously saved digital data. In the end, only one set of digital data per form or confirmation of receipt is stored. Alternatively or additionally, the electronic pen 11 and/or the station may automatically recognise the form 10 being at least partly reprocessed by the deliverer 7 when he recognises that the form 10 was not correctly filled in (on the basis of the error report and/or independently therefrom).

Figure 3:
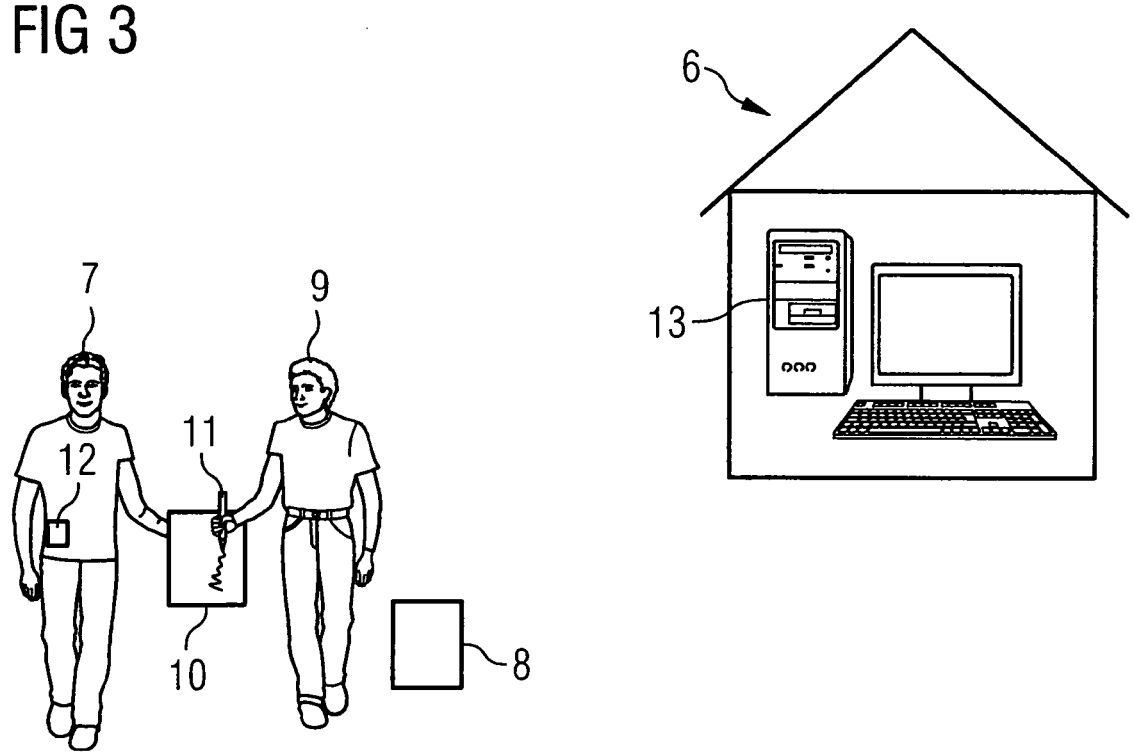
FIG. 3 is a schematic illustration of a system used in postal services.

After having given a general overview over a system according to a preferred embodiment of the present invention, a specific system is now described that is employed particularly in a postal or courier service with reference to FIG. 3. In general, the postal service maintains multiple post offices 6, one of which is shown in FIG. 3. Postmen 7 (as preferred deliverers) deliver letters and packages or parcels 8 from the post office 6 to various addressees 9. In some cases the addressee 9 has to confirm receipt of the letter or package 8 by filling and signing a form 10. However, in practice the forms 10 are often incorrectly filled in or they are not signed. Such deficiencies are frequently not noticed until the form 10 is brought back to the post office 6. If the deficiencies are such that they can only be removed with support or assistance of the addressee 9, the postman 7 has normally to return to the addressee 9 in order to amend or to complete the form 10. However, with the system according to a preferred embodiment of the present invention additional trips to the addressee 9 can be advantageously avoided, since the system enables monitoring the filling in of form 10 within a short delay (such as few seconds to few minutes), preferably substantially in realtime, while it is filled outside and remote from the post office 6, and, if a deficiency in the filling or executing of the form 10 is noticed or detected, the system immediately draws the attention of the postman 7 to the incorrectly filled form 10 so that he can remove the deficiencies while being yet with the addressee 9.

The system comprises in general an electronic writing means or electronic pen 11, a mobile station 12 and a monitoring station being preferably a stationary station 13. Both the electronic pen 11 and the mobile station 12 are mobile and they are both ported by the postman 7 during his trip to the addressee 9. For reasons of simplicity the monitoring or stationary station 13 is shown to be located at the post office 6, however, it could for example also be located at a remote headquarters of the postal service. It is also possible to have parts of the stationary station 13 scattered at different positions, for example a processing means at a local post office and storage means or databases at the headquarters, or the Work Station for receiving data in step 1 of FIG. 1 and the database for storing data in step 5 of FIG. 1 at a local post office and the WDC platform 3 of FIG. 1 elsewhere.

A wireless one-, two- or multiple-way connection (preferably by Bluetooth) is provided between the electronic pen 11 and the mobile station 12. Between the mobile station 12 and the stationary station 13 there is provided one-, two- or multiple-way connection, preferably there is provided a two-way connection. In a case where the stationary station 13 is not located at the post office 6, but is located for example at a remote headquarters, the two-way connection between the mobile station 12 and the stationary station 13 may either be a direct connection, or said two-way connection may be an indirect connection leading for example via the post office 6 which serves as an intermediate station between the mobile station 12 and the stationary station 13, and which is further linked by wireless connection to the mobile station 12, and which is either by wire or wireless connection linked to the stationary station 13. For reasons of simplicity, in the shown example the mobile station 12 is directly connected to the stationary station 13. The connection between the mobile station 12 and the stationary station 13 may be provided by the Internet and/or UMTS and/or GPRS and/or MMS and/or SMS, where for each of the two ways of said connection a different kind of connection can be chosen. In the present example the two-way connection between mobile station 12 and stationary station 13 is the Internet for the direction from the mobile station 12 to the stationary station 13, while SMS is provided for the direction from the stationary station 13 to the mobile station 12.

Figure 4:
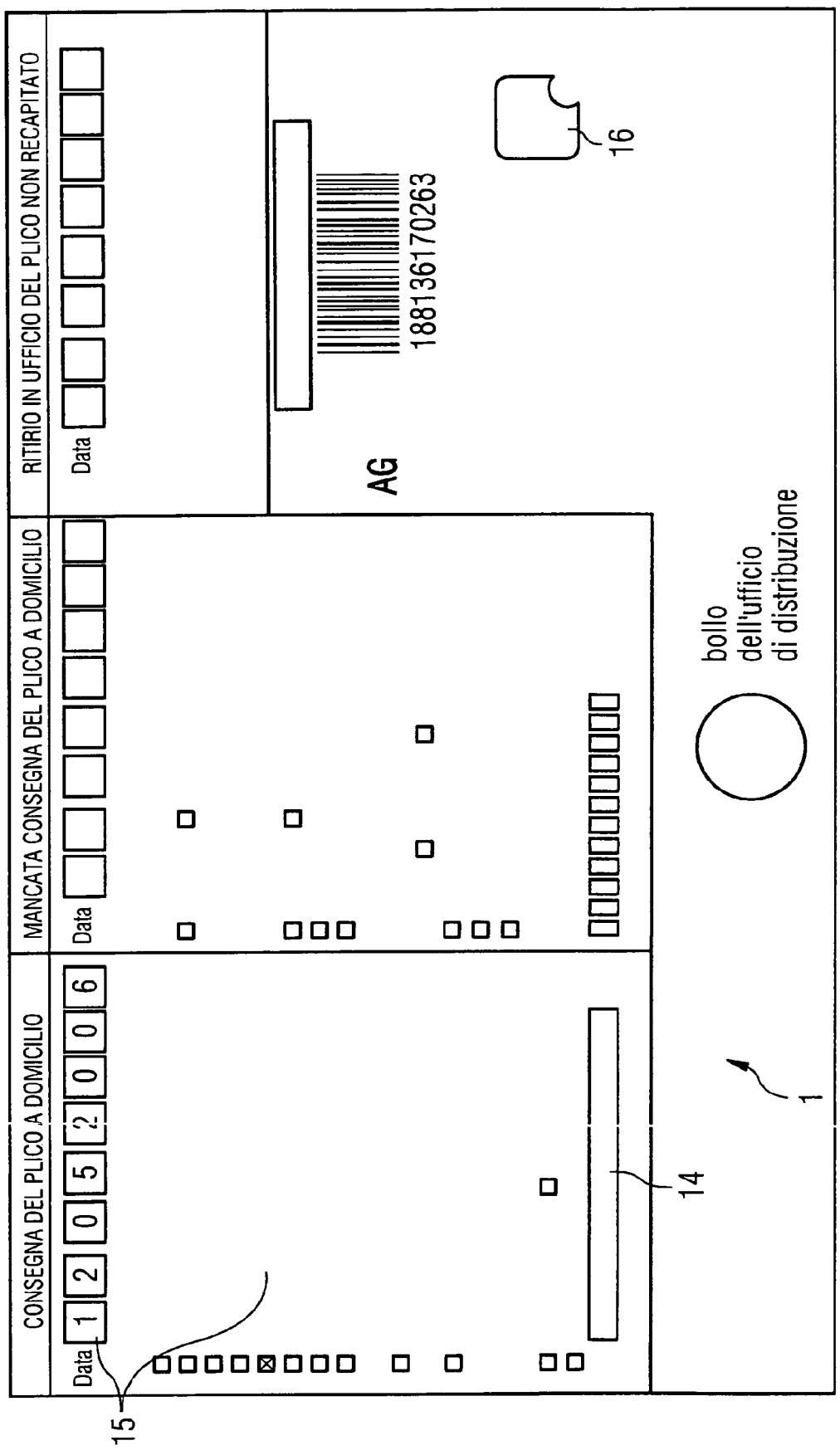
FIG. 4 is an illustration of a form.

An exemplary form 10 is shown in FIG. 4 which shows in facsimile format a form of the Italian postal service. The form 10 is in the present case a piece of cardboard or paper and has a surface which is structured to comprise one or more predefined areas 14, 15 and 16. It is to be understood, however, that the form could in general be any object having a structured surface with one or more predefined areas. The predefined areas 14, 15 are to be filled in or executed preferably in a hand-written way. For example, the predefined areas 14, 15, 16 comprise a first predefined area 14 which is to be signed by the person or addressee who received the item by the deliverer 7, and one or more second predefined areas 15 in which additional information e.g. on the delivery date and the person who received the item have to be noted. Area 16 will be described below. Preferably all predefined areas 14, 15, 16 are at least partly covered or provided with a coding pattern. As could be seen, one distinguishes in general different categories of predefined areas 14, 15: first predefined areas 14 which can not be filled in without support of the addressee 9 (or the person who received the item), like the area 14 which has to be signed by the addressee 9 in person, and second predefined areas 15 which can be filled in without support of the addressee 9 (like areas in which the delivery date, the person who received the item, the person who delivered the item, whether receipt of the item was denied, the specific reasons therefor, the reason for non-delivery or the like) have to be filled in.

FIG. 5 depicts a schematic and illustrative view of the electronic pen 11. The electronic pen 11 comprises a writing tip 17, detection means 18, processing means 19 and a transceiver 20. The detection means 18 and the transceiver 20 are connected to the processing means 19.

FIG. 6 shows a schematic view of the mobile station 12. The mobile station 12 comprises a display 21, a transceiver 22, an interface (preferably an USB-interface) 23, storage means 24, a keyboard 25 and a reading device 26 for reading credit cards or any other card for payment with electronic cash. Other embodiments of the mobile station 12 have the reading device integrated into a separate device for electronic payment called POS, the POS device being preferably wireless connected with the mobile station 12. The mobile station 12 is further enabled to get access to GPS by transceiver 22, which comprises for this purpose a modem.

Figure 7:
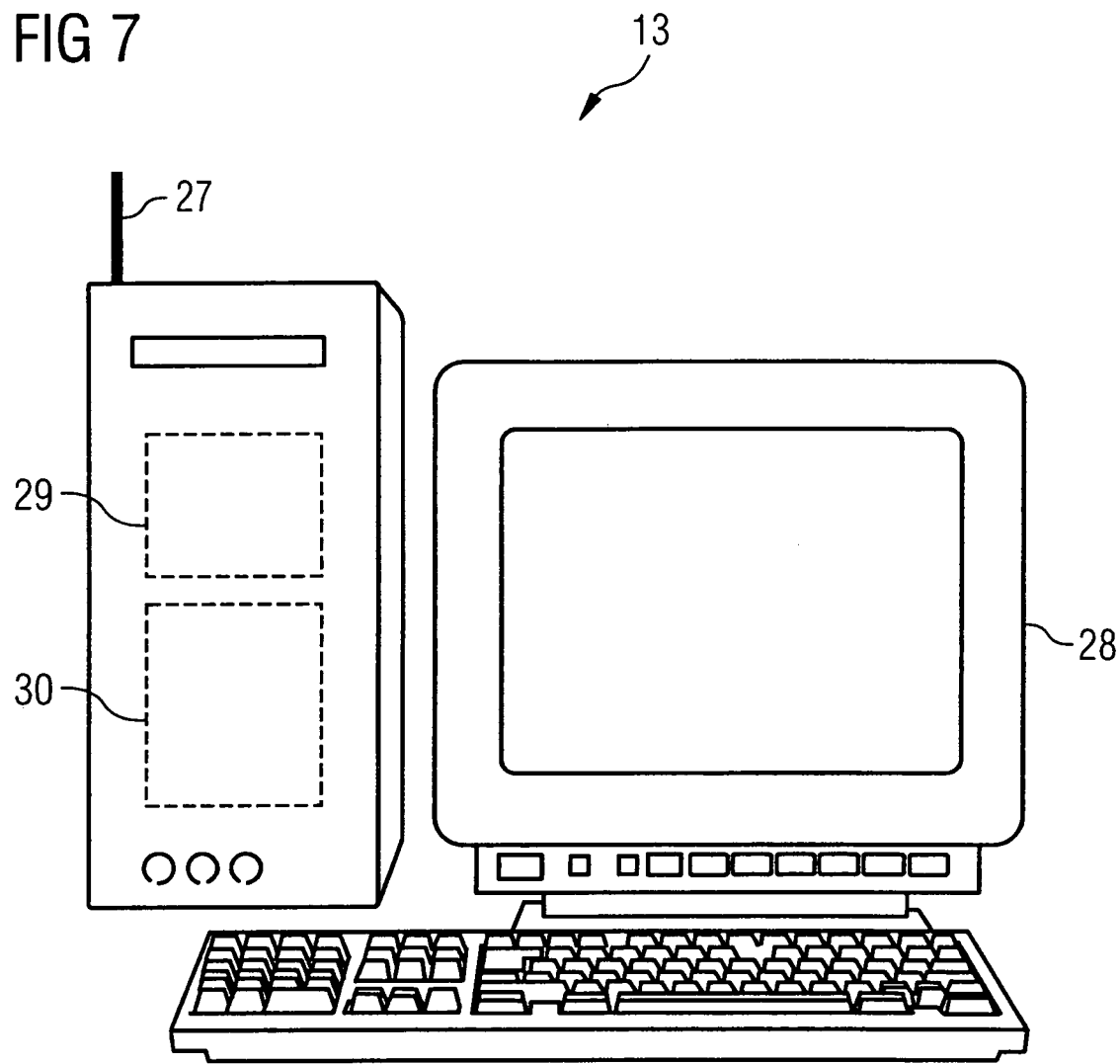
FIG. 7 is a schematic illustration of a monitoring or stationary station.

Furthermore, FIG. 7 shows the stationary station 13, which comprises a transceiver 27, a processing device 28, storage means 29 and a server 30. The stationary station 13 is enabled to get access to GPS by transceiver 27. Further, the storage means 29 has stored therein a database of multiple mailing addresses.

Figure 9:
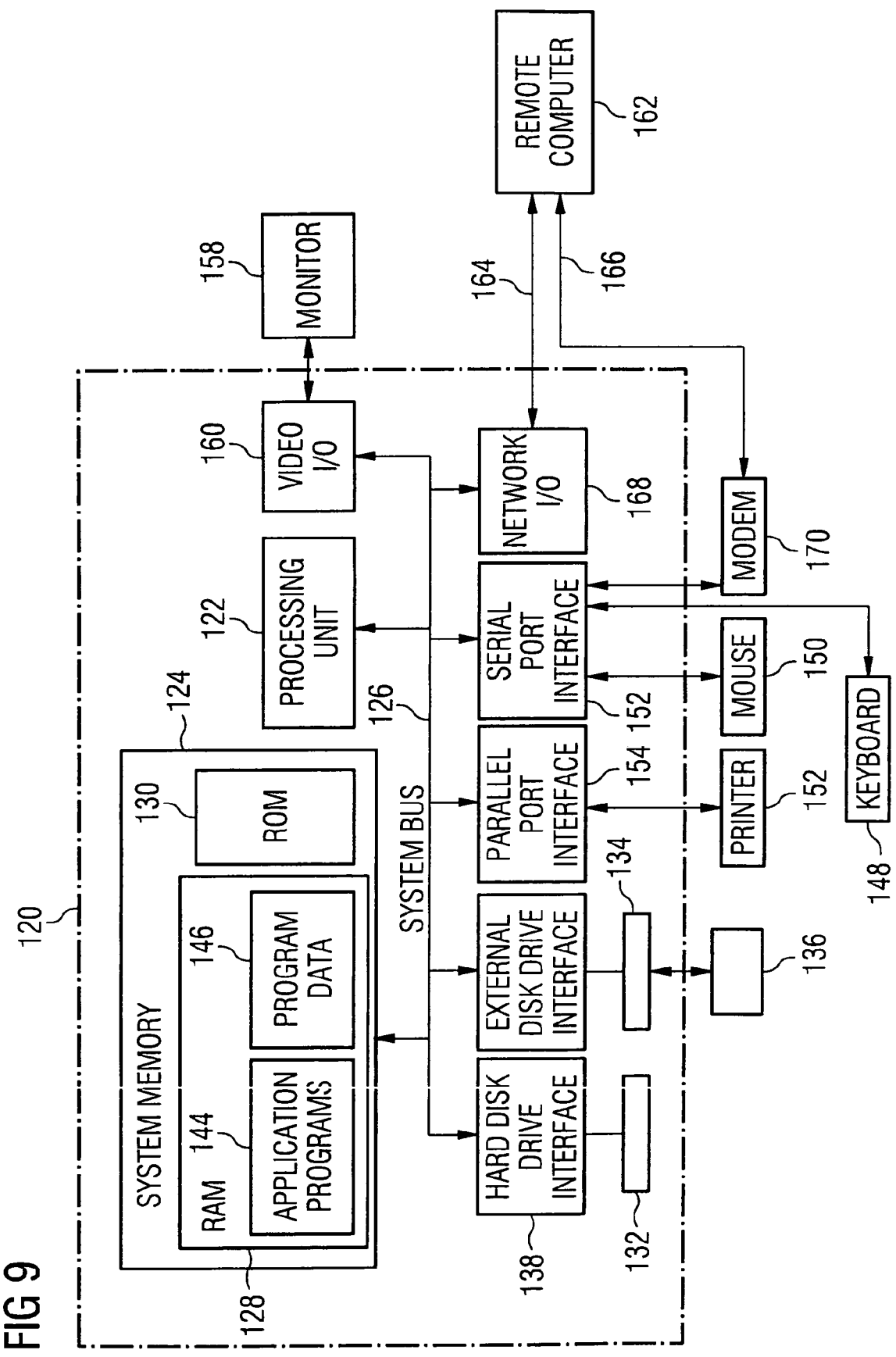
FIG. 9 is a schematic illustration of a processing device.

With reference to FIG. 9, an exemplary system for implementing the processing device 28 and/or the above WDC (Wireless Delivery Center) platform 3 and/or implementing applications needed at the mobile device 3 and/or at the monitoring or stationary station 5 includes a general purpose computing device in the form of a conventional computing environment 120 (e.g. personal computer), including a processing unit 122, a system memory 124, and a system bus 126, that couples various system components including the system memory 124 to the processing unit 122. The processing unit 122 may perform arithmetic, logic and/or control operations by accessing system memory 124. The system memory 124 may store information and/or instructions for use in combination with processing unit 122. The system memory 124 may include volatile and non-volatile memory, such as random access memory (RAM) 128 and read only memory (ROM) 130. A basic input/output system (BIOS) containing the basic routines that helps to transfer information between elements within the personal computer 120, such as during start-up, may be stored in ROM 130. The system bus 126 may be any of several types of bus structures including a memory bus or memory controller, a peripheral bus, and a local bus using any of a variety of bus architectures.

The personal computer 120 may further include a hard disk drive 132 for reading from and writing to a hard disk (not shown), and an external disk drive 134 for reading from or writing to a removable disk 136. The removable disk may be a magnetic disk for a magnetic disk driver or an optical disk such as a CD ROM for an optical disk drive. The hard disk drive 132 and external disk drive 134 are connected to the system bus 126 by a hard disk drive interface 138 and an external disk drive interface 140, respectively. The drives and their associated computer-readable media provide nonvolatile storage of computer readable instructions, data structures, program modules and other data for the personal computer 120. The data structures may include relevant data of the implementation of the method for monitoring the filling of remote forms. The relevant data may be organized in a database, for example a relational or object database.

Although the exemplary environment described herein employs a hard disk (not shown) and an external disk 136, it should be appreciated by those skilled in the art that other types of computer readable media which can store data that is accessible by a computer, such as magnetic cassettes, flash memory cards, digital video disks, random access memories; read only memories, and the like, may also be used in the exemplary operating environment.

A number of program modules may be stored on the hard disk, external disk 136, ROM 130 or RAM 128, including an operating system (not shown), one or more application programs 144, other program modules (not shown), and program data 146. The application programs may include at least a part of the functionality as detailed in FIGS. 1 to 3.

A user may enter commands and information, as discussed below, into the personal computer 120 through input devices such as keyboard 148 and mouse 150. Other input devices (not shown) may include a microphone (or other sensors), joystick, game pad, scanner, or the like. These and other input devices may be connected to the processing unit 122 through a serial port interface 152 that is coupled to the system bus 126, or may be collected by other interfaces, such as a parallel port interface 154, game port or a universal serial bus (USB). Further, information may be printed using printer 156. The printer 156, and other parallel input/output devices may be connected to the processing unit 122 through parallel port interface 154. A monitor 158 or other type of display device is also connected to the system bus 126 via an interface, such as a video input/output 160. In addition to the monitor, computing environment 120 may include other peripheral output devices (not shown), such as speakers or other audible output.

The computing environment 120 may communicate with other electronic devices such as a computer, telephone (wired or wireless), personal digital assistant, television, or the like. To communicate, the computer environment 120 may operate in a networked environment using connections to one or more electronic devices. FIG. 9 depicts the computer environment networked with remote computer 162. The remote computer 162 may be another computing environment such as a server, a router, a network PC, a peer device or other common network node, and may include many or all of the elements described above relative to the computing environment 120. The logical connections depicted in FIG. 9 include a local area network (LAN) 164 and a wide area network (WAN) 166. Such networking environments are commonplace in offices, enterprise-wide computer networks, intranets and the Internet.

When used in a LAN networking environment, the computing environment 120 may be connected to the LAN 164 through a network I/O 168. When used in a WAN networking environment, the computing environment 120 may include a modem 170 or other means for establishing communications over the WAN 66. The modem 70, which may be internal or external to computing environment 120, is connected to the system bus 126 via the serial port interface 152. In a networked environment, program modules depicted relative to the computing environment 120, or portions thereof, may be stored in a remote memory storage device resident on or accessible to remote computer 162. Furthermore other data relevant to the application of the method for monitoring the filling of remote forms may be resident on or accessible via the remote computer 162. The data may be stored for example in an object or a relation database. It will be appreciated that the network connections shown are exemplary and other means of establishing a communications link between the electronic devices may be used.

The above-described computing system is only one example of the type of computing system that may be used to implement the method for monitoring the filling of remote forms.

In the following, the operation of the system is described.

Before postman 7 as the deliverer 7 begins his delivery tour to one or more, preferably multiple addressees 9, an operator at the stationary station 13, based on the database of mailing addresses of the addressees 7, generates a list of the addresses of all addressees 9, which postman 7 has to visit on his trip. Stationary station 13 then gets access to GPS by transceiver 27 and collects data regarding the respective addresses of the list. Based on this data obtained by means of GPS, the processing device 28 determines at least part of the route, preferably the shortest or fastest route which connects all the addresses of the list. The list of addresses as well as the (shortest or fastest) route are fed by the operator into mobile station 12 preferably by the USB-interface and are stored in its storage means 24. If postman 7 starts his tour from the location of stationary station 13, the mobile station 12 can be directly linked by wire with the stationary station 13 to transmit the list of addresses and the (shortest/fastest) route. If, however, the postman 7 starts his tour from a different point than the location of the stationary station 13, then the list of addresses and the (shortest/fastest) route have to be transmitted to postman 7 before they can be fed into his mobile station 12. This transmission can be direct by a wireless connection between the stationary station 13 and the mobile station 12 or it can occur by transmitting the data firstly to a not shown intermediate station, to which postman 7 can connect his mobile station 12 in order to feed the transmitted data into his mobile station 12. Alternatively or additionally, the route may be computed, determined and/or updated in a delocalized manner at the mobile station 12 on the basis of the address list.

After having got the list of addresses that are to be visited and the (shortest/fastest) route between these addresses, postman 7 sets out for his tour. Thanks to display 21, which is able to display at least part of the list of addresses and/or the (shortest/fastest) route e.g. on a city map, postman 7 is at any time well informed about the route he has to take. Further, since its mobile station 12 preferably has access to GPS, the postman 7 is at any time well informed about his current position, which may be moreover (permanently and/or intermittently) transmitted to the stationary station 13 preferably by the Internet connection between mobile station 12 and stationary station 13, so that the operator at stationary station 13 may be also (permanently/intermittently) informed about the current position of the postman 7.

Having arrived at an assigned address, it may be that postman 7 discovers that the respective address is for some reasons not correct any more or needs to be updated. He may then enter an amendment or update of the respective address by keyboard 25 into the mobile station 12. The amendment preferably is stored in storage means 24 until postman 7 finishes his tour and returns to stationary station 13, where it is transmitted into stationary station 13 to amend the address in the database of mailing addressees. Alternatively or additionally, the amendments can be immediately sent or sent upon request from the mobile station 12 to the stationary station 13 preferably by the Internet connection with transceiver 27, established by the modem of transceiver 22.

If postman 7 meets the addressee 9 (or any person entitled to receive package, letter and/or item 8 instead of the addressee), postman 7 hands package, letter and/or item 8 over to the addressee 9. In the case of delivery, second predefined areas 15 of the form 10 have to be filled in either by the postman 7 or the addressee 9, and the first predefined area 14 has to be signed by the addressee 9.

For filling in or executing form 10 the electronic pen 11 is used. While writing on the form 10 by moving the writing tip 17 over its surface to generate written information thereon (e.g. by means of ink), the electronic pen 11 at the preferably substantially same time detects this written information with detection means 18. The detected written information is transmitted to processing means 19, which converts the detected written information into digital data (either in form of image data and/or in any other processed or unprocessed form).

Having completed the filling in of form 10, the default area 16 on the form 10 is marked with the electronic pen 11. Marking of the default area 16 is noticed or determined by the processing means 19, causing the processing means 19 to initiate transmittal of the digital data to the mobile station 12 in the form of a specified (predetermined or predeterminable) protocol. For this reason transceiver 20 establishes a (preferably Bluetooth) connection with the mobile station 12 and the digital data are transmitted by the (preferably Bluetooth) connection between transceivers 20 and 22 to the mobile station 12.

The digital data are then (preferably substantially immediately) transferred from the mobile station 12 to the stationary station 13 preferably by the Internet connection. At the stationary station 13 the processing device 28, on the bases of the received digital data, checks that the form 10 is correctly filled in. Said check occurs (preferably substantially immediately or within a short time-frame such as few seconds to few minutes) after filling in the form 10. For this purpose the content of the predefined areas 14, 15 and 16 is analysed (such as by means of Optical Character Recognition, OCR) preferably at the stationary or monitoring station 13 at least partly on the basis of the data transmitted by the electronic pen 11 via the mobile device 12 and comparing the result with predefined results e.g. stored in databases. In other words, the marked information is checked for its completeness and/or correctness and a corresponding result is determined and further processed, as follows.

If the check reveals that the one or more second predefined areas 15 were incorrectly filled in, the processing device 28 creates a failure report which is stored in storage means 29 until postman 7 finishes his tour and returns to the stationary station 13, since the second predefined areas 15 are of a kind which can be amended or completed without support of the addressee 9, so that the amendment of incorrectly filled in second predefined areas 15 can be performed after the return of postman 7. Alternatively or additionally, the error report may be communicated to the postman 7 at an earlier stage, e.g. also substantially real-time.

If, however, the one or more first predefined areas 14 are incorrectly filled in or executed, e.g. the check reveals that the signature of the addressee 9 in the first predefined area 14 is lacking, a notification (preferably in the form of an SMS) is sent from the stationary station 13 to the mobile station 12 in a close time relationship (e.g. within few seconds to minutes). This notification (such as the SMS) is displayed on display 21 of mobile station 12, and/or (preferably at the same time) an acoustical and/or vibrational signal is generated by the mobile station 12 to draw the attention of postman 7 to the display 21. The postman 7, being yet at the addressee 9 or having just departed from the addressee 9, has in such way advantageously the possibility to immediately return to the addressee 9 and to correct or to complete the false or incomplete filled in form 10, e.g. by immediately returning back to the addressee 9 to catch his signature on the form 10.

If this second attempt to correctly fill in form 10 also fails, the described procedure repeats beginning with the step of writing on the surface of the form 10, until the check of the digital data in the stationary station 13 reveals that the form 10 has been substantially correctly filled in and/or a specified (predetermined or predeterminable) number of trials or errors has been exceeded.

The digital data received from the stationary station 13, or the last received digital data in the case of multiple attempts to correctly fill in form 10, are converted back into the written information e.g. in facsimile format. The (facsimile) written information in digital form together with an image of the form 10 are stored in storage means 29. Due to the server 30, the written information (e.g. as a facsimile bitmap with a predefined resolution) and the image of the form 10, showing the written information filled in or executed in the predefined areas 14, 15, are accessible for the third parties, such as the sender of the item 8, by means of remote access means such as by means of the Internet preferably with suitable access restriction. Thus, the customer who has sent package 8, can independently assure himself about the correct receipt of package 8 preferably substantially in real-time or with only a short time delay.

In the case that a payment (such as a payment for the receipt of package 8, and/or payments upon delivery and/or for official notifications e.g. of fines) has to be made by addressee 9, there is the possibility to pay by credit card or electronic cash. For the purpose of electronic payment the addressee 9 at least partly inserts his credit card or another corresponding card into reading device 26 or slides it through the reading device 26. Using keyboard 25, the addressee 9 may validate the payment e.g. by inputting his Personal Identification Number (PIN). After the payment has been validated and/or performed, a report about the payment may be either stored in the storage means 24 for delivering the report to the stationary station 13 at a later point in time (e.g. after the postman 7 has finished the tour), or the report is substantially immediately sent from the mobile station 12 to the stationary station 13. Should the addressee 9 pay not electronically (e.g. in cash or in other way such as with manually filled in credit card slips), the postman 7 may create a respective report using an input means such as keyboard 25, wherein said report is also either stored in storage means 24 for delivering the report to the stationary station 13 e.g. after postman 7 has finished the tour, or it is preferably substantially immediately sent from the mobile station 12 to the stationary station 13.

Although in the foregoing the invention has been described using the example of a system with only one mobile station 12 and only one electronic pen 11, it is to be understood that it is possible to provide multiple mobile stations 12 and multiple electronic pens 11 to equip multiple postmen 15, so that the multiple postmen 15 can make multiple individual tours concurrently or at the substantially same time while their respective mobile station 12 are connectable with the same stationary station 13.

Accordingly, there is provided a system, a method and a computer program product, preferably embodied in form of a computer-readable storage means or signal, for monitoring the filling of remote forms 10 with at least one electronic writing means 11, with at least one mobile station 12 and with a monitoring station 13. The electronic writing means 11 is equipped to read information written by said writing means 11 on a surface of a form 10, wherein the surface preferably is structured to comprise at least one predefined area 14, 15, 16 covered with a positioning coding pattern. The writing means 11 particularly is further equipped to convert the read information into digital data and to send said digital data to the mobile station 12 with a first transceiver 20. The mobile station 12 includes output means 21 for generating an output, a second transceiver 22 for receiving data and for sending the digital data received to the monitoring station 13 preferably substantially immediately after their receipt or shortly after (such as within few seconds to few minutes). The monitoring station 13 includes a third transceiver 27 and processing means 28. When the third transceiver 27 receives the digital data sent from the second transceiver 22, the processing means 28, on the bases of said received digital data, monitors (particularly checks or verifies) that the form is correctly filled in and, if at least one of first predefined areas 14 of the form 10 is incorrectly filled in, the third transceiver 27 sends a notification to the mobile station 12, whose output means 21 generates an output after receiving said notification by the second transceiver 22.

It should be understood that any detection of the filling in of the form 10 may be used in connection with the above system and method. For instance, a signature of the addressee 7 on the form 10 as performed by a common pen may be electronically detected e.g. by the form 10 being placed on a pressure sensitive surface of an underlying electronic device, thus allowing the (substantial contemporary) recognition of the information filled in at a position of the form corresponding to the underlying pressure sensitive areas of the electronic device. In other words, it is possible to place the form 10 on the electronic device which detects (e.g. by pressure sensitivity, electromagnetic variations or the like) the information being written on the overlying form 10 so as to allow its transmission to the stationary or monitoring station 13.

Moreover, it should be understood that even though in the above described embodiments the electronic pen 11 and the mobile station 12 are two separate devices being connected by means of a one-, bi- or multidirectional communication, the pen and the mobile station 12 may be integrated to an integral device.

LIST OF REFERENCE NUMERALS 1 step of receiving data
2 operations at the addressee
3 WDC platform
4 Internet application
5 storing data
6 post office
7 deliverer (postman or courier)
8 item to be delivered (e.g. letter, registered mail, package or parcel)
9 addressee
10 form
11 electronic pen
12 mobile station
13 monitoring or stationary station
14 first predefined area
15 second predefined area
16 default area
17 writing tip
18 detection means
19 processing means
20 transceiver
21 display
22 transceiver
23 USB-interface
24 storage means
25 keyboard
26 reading device
27 transceiver
28 processing device
29 storage means
30 server
31 application server handler
120 personal computer
122 processing unit
124 system memory
126 system bus
128 RAM
130 ROM
132 hard disk drive
134 external disk drive
136 removable disk
138 hard disk drive interface
140 external disk drive interface
144 application program
146 program data
148 keyboard
150 mouse
152 serial port interface
154 parallel port interface
156 printer
158 monitor
160 video input/output
162 remote computer
164 local area network
166 wide area network
168 network I/O
170 modem

The invention claimed is:

1. A system for monitoring the filling in of forms comprising:
   an electronic writing device; and
   a mobile station;
   the electronic writing device comprising:
      a detector operable to detect form input data while the electronic writing device is moved, on a form, in a position corresponding to a first predefined area of the form and a second predefined area of the form; and
      a first transceiver for sending the form input data to the mobile station;
   the mobile station comprising:
      an output for generating an output signal; and
      a second transceiver for receiving the form input data from the electronic writing device and for sending the form input data to a monitoring station that is separate from the mobile station and separate from the electronic writing device; and
   where when the form input data corresponding to the first predefined area of the form is deficient, then the second transceiver in the mobile station is operable to receive a first error notification from the monitoring station specifying that the form input data corresponding to the first predefined area is deficient;
   where when the form input data corresponding to the second predefined area of the form is deficient, then the second transceiver is operable to not receive from the monitoring station a second error notification specifying that the form input data corresponding to the second predefined area is deficient; and
   where the output of the mobile station generates the output signal in response to receiving any error notification by the second transceiver.

2. A system according to claim 1, wherein the electronic writing device comprises a writing tip for writing information on a surface of the form by moving the writing tip over the surface, the surface comprising a positioning coding pattern, and wherein the detector detects the form input data while it is written by the writing tip into the first predefined area.

3. A system according to claim 1, wherein the electronic writing device comprises a processor for processing the form input data and at least partly converting the form input data into digital data before or while the first transceiver sends said digital data to the mobile station.

4. A system according to claim 1, wherein the electronic writing device and the mobile station are connected by Bluetooth for transmission of the form input data.

5. A system according to claim 1, wherein the mobile station and the monitoring station are connected by the Internet, UMTS (Universal Mobile Telecommunication System), GPRS (General Packet Radio System), MMS (Multimedia Messaging Service), or any combination thereof, for sending the form input data, for sending the first error notification, or both.

6. A system according to claim 1, wherein the mobile station receives the first error notification by SMS (Short Message Service), by MMS, by email, or any combination thereof.

7. A system according to claim 1, wherein the output is an optical output, acoustical output, or both.

8. A system according to claim 1, wherein the mobile station comprises an interface for receiving data, and storage for storing data received through the interface, and where the output comprise a display for displaying said data, wherein the interface comprises an USB (Universal Serial Bus) interface, a Bluetooth interface, or both.

9. A system according to claim 1, wherein the mobile station has access to an address database for updating mailing addresses stored in the address database, wherein changes of mailing addresses can be manually input into the mobile station.

10. A system according to claim 1, wherein the mobile station has access to GPS (Global Positioning System) for determining an addressee route comprising a shortest route to a mailing address, a shortest route which connects several mailing addressees, or both.

11. A system according to claim 1, wherein the mobile station has access to GPS and where the mobile station determines its current position based on data received from GPS, and sends information about its current position to the monitoring station.

12. A system according to claim 1, wherein the mobile station comprises a payment device that supports the performance of online payments.

13. A system according to claim 12, wherein the second transceiver of the mobile station is operable to send information regarding online payments, cash payments, or both to the monitoring station.

14. A system according to claim 12, wherein the mobile station comprises storage for storing data regarding payments made.

15. A system according to claim 1, wherein the first transceiver of the electronic writing device is operable to send form input data to the mobile station in response to the electronic writing device marking a transmit area of the form.

16. The system according to claim 1, where, after receiving the notification indicating that the first predefined area is incorrectly filled in, the second transceiver of the mobile station is operable to:
receive amended data corresponding to the first predefined area of the form; and
send the amended data to the monitoring station.

17. The system according to claim 1, where the first predefined area requires filling in by an addressee and where the second predefined area can be filled in by a person other than the addressee.

18. The system according to claim 1, where the notification further indicates the monitoring station has interrupted processing of the form input data.

19. A method comprising:
providing a form comprising a first predefined area and a second predefined area;
electronically obtaining form input data written into the first predefined area and the second predefined area by an electronic writing device;
sending the form input data from the electronic writing device to a mobile station;
sending the form input data from the mobile station to a monitoring station;
when the form input data corresponding to the first predefined area of the form is deficient, then receiving, by the mobile station from the monitoring station, a first error notification specifying that the form input data corresponding to the first predefined area is deficient; and
when the form input data in the second predefined area of the form is deficient, then not receiving, by the mobile station from the monitoring station, a second error notification specifying that the form input data for the second predefined area is deficient; and
in response to receiving any error notification at the mobile station, generating an output signal with the mobile station.

20. A method according to claim 19, wherein the form has a structured surface such that first predefined area comprises or is at least partly covered with a positioning coding pattern.

21. A method according to claim 19, wherein obtaining, sending to the mobile station, and sending to the monitoring station are repeated until the mobile station receives a confirmation from the monitoring station that all of the first predefined areas of the form are substantially correctly filled in.

22. A method according to claim 19, further comprising determining an addressee route comprising a shortest route to a mailing address, a shortest route which connects several mailing addressees, or both.

23. A method according to claim 19, comprising sending the form input data when a transmit area of the first predefined area is marked with the electronic writing device.

24. The method according to claim 19, further comprising:
after receiving the notification indicating that the first predefined area is incorrectly filled in:
receiving, by the mobile station, amended data corresponding to the first predefined area of the form; and
sending the amended data from the mobile station to the monitoring station.

25. The method according to claim 19, where the first predefined area requires filling in by an addressee and where the second predefined area can be filled in by a person other than the addressee.

26. The method according to claim 19, where the notification further indicates the monitoring station has interrupted processing of the form input data.

27. The method according to claim 19, further comprising:
identifying, by the monitoring station, that the form input data in the second predefined area of the form is deficient;
generating an error report identifying that the form input data in the second predefined area of the form is deficient, but not sending, to the mobile station, the error notification specifying that the second predefined area is deficient.

28. The method according to claim 27, further comprising:
receiving, by the mobile station, an error reporting identifying that the second predefined area of the form is deficient; and
where generating an output with the mobile station comprises foregoing generating an output in response to receiving the error report and generating the output in response to receiving any error notification.

29. An article of manufacture comprising:
a non-transitory computer readable storage; and
computer-readable instructions stored on the non-transitory computer readable storage that cause a processor to:
provide a form comprising a first predefined area;
obtain form input data written into the first predefined area by an electronic writing device;
send the form input data from the electronic writing device to a mobile station;
send the form input data from the mobile station to a monitoring station;
when the when the form input data corresponding to the first predefined area of the form is deficient, then receive, by the mobile station from the monitoring station, a notification specifying that the first predefined area of the form is deficient;
when the form input data corresponding to the second predefined area of the form is deficient, then not receive, by the mobile station from the monitoring station, a second error notification specifying that the second predefined area is deficient; and in response to receiving any error notification at the mobile station, generate an output with output of the mobile station.

30. The article of manufacture of claim 29, where the computer-readable instructions further cause the processor to:
  after the mobile station receives the notification indicating that the first predefined area is incorrectly filled in:
    receive, by the mobile station, amended data corresponding to the first predefined area of the form when the first predefined area is incorrectly filled in; and
    send the amended data from the mobile station to the monitoring station.

31. The article of manufacture of claim 29, where the notification further indicates the monitoring station has interrupted processing of the form input data.

* * * * *

UNITED STATES PATENT AND TRADEMARK OFFICE
CERTIFICATE OF CORRECTION

PATENT NO. : 8,554,184 B2  Page 1 of 1
APPLICATION NO. : 12/373724
DATED : October 8, 2013
INVENTOR(S) : Del Gallo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1264 days.

Signed and Sealed this

Fifteenth Day of September, 2015

Michelle K. Lee
*Director of the United States Patent and Trademark Office*